United States Patent [19]

Nanzan et al.

[11] Patent Number: 5,113,126
[45] Date of Patent: May 12, 1992

[54] CONTROL DEVICE FOR ELECTRIC CAR

[75] Inventors: Tatsusuke Nanzan; Hideo Obi; Masahiko Nakamoto; Noriaki Nakamoto; Mikio Ohta, all of Hyogo, Japan

[73] Assignee: Mitsubishi Danki Kabushiki Kaisha, Tokyo, Japan

[21] Appl. No.: 566,319

[22] Filed: Aug. 13, 1990

Related U.S. Application Data

[63] Continuation of Ser. No. 299,422, Jan. 23, 1989, abandoned.

[30] Foreign Application Priority Data

Jan. 21, 1988 [JP] Japan .................................. 63-11216

[51] Int. Cl.⁵ ................................................ H02P 5/40
[52] U.S. Cl. ...................................... 318/809; 363/39
[58] Field of Search .............................. 363/39, 47; 318/801–803, 807–811; 328/167

[56] References Cited

U.S. PATENT DOCUMENTS

| | | | |
|---|---|---|---|
| 3,691,439 | 9/1972 | Jensen et al. ........................... | 363/39 |
| 3,746,963 | 7/1973 | VeNard, II .............................. | 363/47 |
| 4,247,888 | 1/1981 | Angquist ................................ | 363/47 |
| 4,651,266 | 3/1987 | Fujioka .................................. | 363/39 |

OTHER PUBLICATIONS

Katta et al., "Indaution Motor Pro Puesion System for Transit Cars", Hatachi Review vol. 29, (1980) No., pp. 19–24.

*Primary Examiner*—David Smith, Jr.
*Attorney, Agent, or Firm*—Oblon, Spivak, McClelland, Maier & Neustadt

[57] ABSTRACT

A control device for an electric vehicle having a reverse L type first filter circuit composed of a first filter reactor and a first filter capacitor between a current collector and control means for controlling electric motor of the electric vehicle. A second filter circuit composed of a series connected second filter reactor and a second filter capacitor is connected in parallel to the first filter capacitor. The second filter circuit has circuit constants selected such that a composite impedance of the second filter circuit and the first filter capacitor when viewed from the control means becomes small at a specific frequency.

1 Claim, 2 Drawing Sheets

CONTROL DEVICE FOR ELECTRIC CAR

This application is a continuation of U.S. Pat. No. 07/299,422, filed on Jan. 23, 1989, now abandoned.

BACKGROUND OF THE INVENTION

The present invention relates to a control device of an electric vehicle and, particularly, to an elimination of an induction problem of a signal system for such electric vehicle due to high frequency current flowing from such control device through a power transmission line.

FIG. 3 shows a typical example of a conventional control device of an electric vehicle which is disclosed in "Drive/Control Device for Prototype Electric Vehicle for Tokyo Metroplitan Traffic Agency Line No. 12", "Reports in the 23rd Domestic Symposium on Utilization of Cybernetics in Rail Way", pages 236 to 240, Japan Rail Way Cybernetics Conference. In FIG. 3, a d.c. electric power is collected from a power line through a current collector 1, a main fuse 2, a main switch 3, a line breaker 4, a trip resistor 5, a high speed breaker 6, a limiting/charging resistor 7, a charging contactor 8, a line breaker 9, filter reactors 10 and 11, an overvoltage series resister 12, an overvoltage thyristor 13, a resistor 14 and a D.C. potential transformer (DCPT) 15 connected in series with the resistor 14. A filter capacitor 16 of a U-phase inverter 17a constitutes, together with the filter reactors 10 and 11, a reverse L-type filter circuit. The U-phase inverter includes a pair of series connected thyristors each having a parallel diode. V and W phase inverters 17b and 17c are also provided to actuate induction motors 18a to 18d.

When the control device constructed as above is operated as a PWM inverter, a high frequency component having frequency 6 times the inverter frequency is superimposed on a d.c. input due to the pulse width modulation.

Therefore, when it is operated at an inverter frequency $f_1 = f_0/6$ where $f_0$ is an operating frequency of a signal device, a high frequency current having a frequency $f_0$ flows through the power line which may cause the signal device to malfunction. In order to solve this problem, it has been usual to increase a value of the filter reactors 10 and 11 to thereby reduce the high frequency current to be sent through the power line.

That is, where a voltage level of the high frequency current flowing through the power line and inductances of the filter reactors 10 and 11 are represented by E, $L_0$ and $L_1$, respectively, an impedance of the power line when viewed from the inverters 17a, 17b and 17c becomes $j\omega(L_0+L_1)$ and, therefore, the high frequency current I flowing into the power line becomes as follows:

$$I = E/j\omega(L_0 + L_1) \quad (1)$$

Thus, by increasing the inductance value ($L_0+L_1$) of the filter reactors, the current I can be reduced below a predetermined standard of disturbing current for signal device at a predetermined frequency as shown by the equation (1).

In the conventional control device for an electric car, in order to increase the inductance value of the reactors, the size thereof becomes very large, necessarily, which requires a large space for equipping them.

SUMMARY OF THE INVENTION

The present invention was made in view of solution of the problem and an object of the present invention is to provide a control device for an electric car which can be manufactured with minimum cost and is compact.

A control device according to the present invention includes, in addition to a reverse L type first filter circuit composed of a first filter reactor and a first filter capacitor and provided between a collector and a control device for controlling a driving motor of an electric car, a second filter circuit composed of a second filter reactor and a second filter capacitor connected in series with the second filter reactor. The second filter circuit is connected in parallel to the first filter capacitor and a sum of impedances of the second filter circuit and the first filter capacitor as viewed from the control device exhibits a small value for a specific frequency.

In the present invention, the sum Z of the impedances of the second filter circuit and the first filter capacitor as viewed from the control device can be represented by the following equation:

$$Z = (1 - \omega^2 L_2 C_2)/j\omega(C_1 + C_2 - \omega^2 L_2 C_1 C_2) \quad (2)$$

where $C_1$ is an impedance of the first filter capacitor, $C_2$ is an impedance of the second filter capacitor and $L_2$ is an impedance of the second filter reactor and values of the respective impedances $C_1$, $C_2$ and $L_2$ are selected such that the impedance Z becomes minimum for the specific frequency.

DETAILED DESCRIPTION OF THE PREFERRED EMBODIMENT

Figure 1:
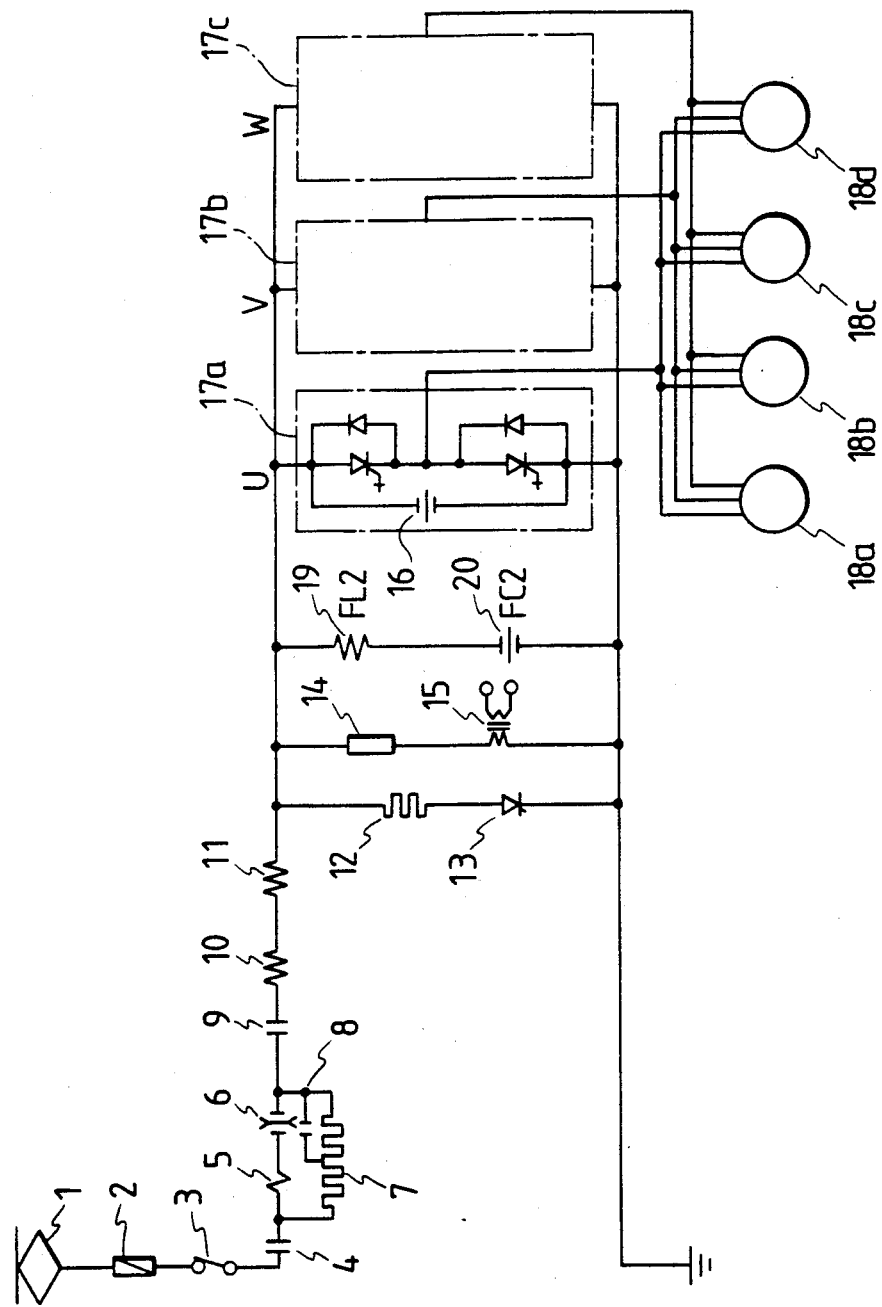
FIG. 1 is a circuit construction of a control device according to an embodiment of the present invention.
Figure 3:
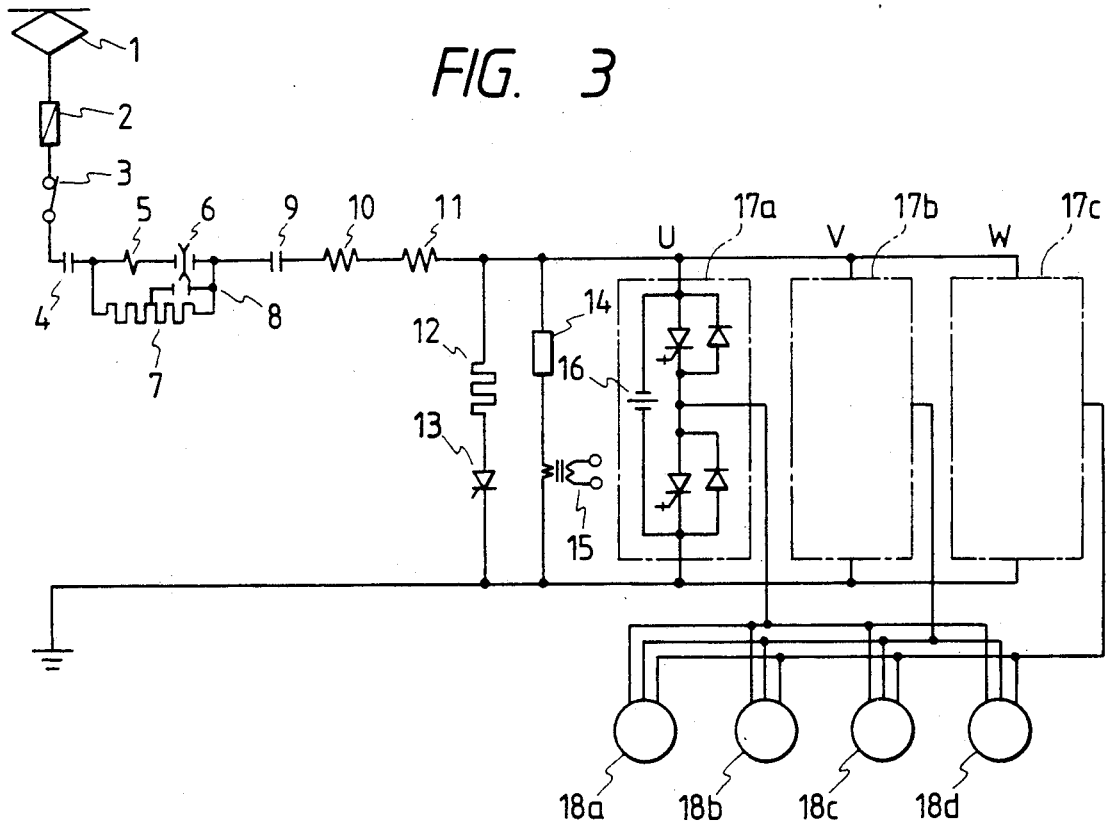
FIG. 3 is a circuit construction of a conventional control device and corresponds to FIG. 1.

In FIG. 1 which is similar to FIG. 3 and same reference numerals depict same components as those shown in FIG. 3, a second filter reactor 19 and a second filter capacitor 20 connected in series with the reactor 19 are connected across parallel connected inverters 17a, 17b and 17c. The reactor 19 and the capacitor 20 constitute a second filter circuit which is connected in parallel to a filter capacitor 16 and circuit constants of the second filter circuit are selected such that a total impedance value of the second filter circuit when viewed from the side of the filter capacitor 16 and the control device becomes small at a specific frequency.

Figure 2:
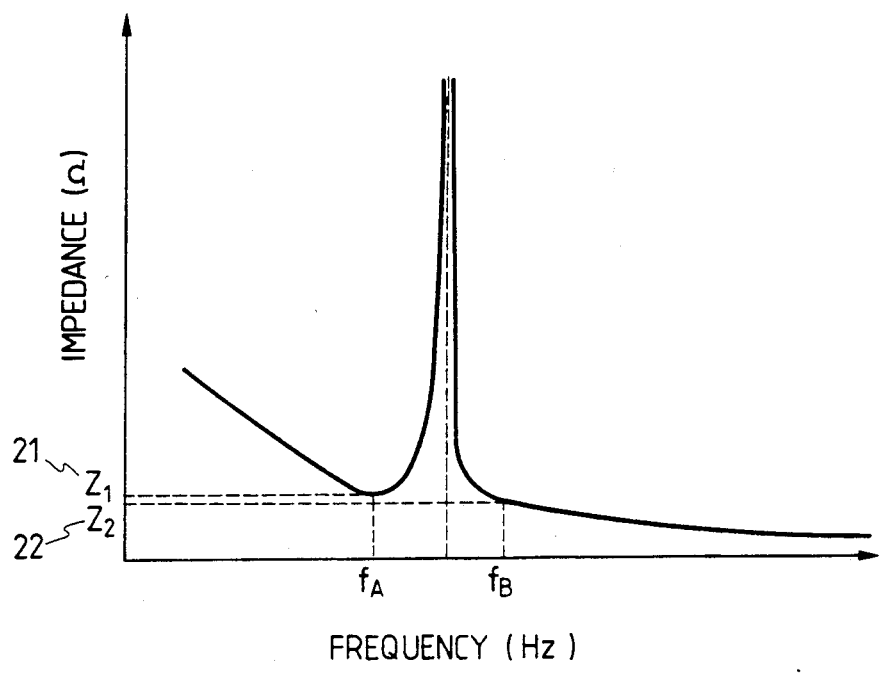
FIG. 2 is a graph showing frequency characteristics of a combined impedance of a second filter circuit and a first filter capacitor in FIG. 1.

FIG. 2 is a graph showing frequency characteristics of the total impedance of the second filter circuit in which reference numerals 21 and 22 depict first and second minimum values thereof, respectively.

In the control device of the electric car constructed as above, when it is assumed that an impedance of the filter circuit composed of the filter reactors 10 and 11 when viewed from the control device to a power line at a specific frequency is represented by $Z_1$ and an impedance of a circuit composed of the filter capacitor 16 (FCU for U phase, FCV for V phase, FCW for W phase), the second filter reactor 19 and the second filter capacitor 20 when viewed from the control device to the power line at a specific frequency is represented by $Z_2$ and that a current I at the specific frequency flows from the inverters 17a, 17b and 17c as the control device through the filter reactor 16 and the second filter circuit 19, 20 in parallel, a ratio of current flowing through the filter reactor to that through the filter circuit is determined by the impedances $Z_1$ and $Z_2$.

Assuming that the current flowing through the impedance $Z_1$ and that through the impedance $Z_2$ are represented by $I_1$ and $I_2$, respectively, the currents I, $I_1$ and $I_2$ are represented by $$I = I_1 + I_2 \tag{3}$$

$$I_1 = I\, Z_2/(Z_1 + Z_2) \tag{4}$$

$$I_2 = I\, Z_1/(Z_1 + Z_2) \tag{5}$$

Therefore, in order to reduce the high frequency current flowing into the power line, it is enough to reduce the current $I_1$ and, in order to minimize the current $I_1$, it is enough to minimize the impedance $Z_2$. Thus, by selecting the circuit constants of the second filter circuit such that the impedance $Z_2$ becomes minimum, it is possible to solve the induction problem for a specific frequency. The circuit constants of the second filter circuit are set such that the total impedance $Z_2$ of this filter circuit and the filter capacitor 16 take a value near either of two minimum values existing for a specific frequency or takes two values near minimum values for two frequencies.

As mentioned above, the present invention includes a second filter circuit composed of a second filter reactor and a second filter capacitor connected in series with the former, the second filter circuit being connected in parallel to a first filter capacitor and having circuit constants selected such that a total impedance of this filter circuit and the first filter capacitor becomes a small value for a specific frequency. Therefore, the induction problem for the specific frequency can be solved and the minimization of the device can be achieved at low cost, resulting in a minimized equipping space.

What is claimed is:

1. An electric vehicle control device for controlling an operation of an electric vehicle to be driven by at least one a.c. motor through an associated control means, comprising:

a reverse L-type first filter circuit comprised of a first filter reactor and a first filter capacitor, located between a current collector and said control means;

a second filter circuit comprised of a second filter reactor and a second filter capacitor connected in series, said second filter reactor and said second filter capacitor being connected in parallel to said first filter capacitor;

said second filter circuit having circuit constants such that a total impedance value of the second filter circuit ad the first filter capacitor, is minimized at a frequency of six times a system operating frequency to reduce high frequency current;

and wherein a total impedance of the first filter reactor is given as $Z_1$;

the total impedance of the second filter circuit is given as $Z_2$;

the current flowing from the associated control means and generated by said at least one a.c. motor is given as I;

a current flowing through said first filter reactor is given as $I_1$; and $$I_1 = I\, Z_2/(Z_1 + Z_2);$$

$Z_2$ being minimized for the frequency of the current generated by said at least one a.c. motor so as to minimize $I_1$ and reduce high frequency current.

* * * * *